July 1, 1952 E. H. ZIPF 2,601,753
CUTTER UNIT FOR MOWING MACHINES
Filed Feb. 17, 1949

INVENTOR.
Edward H. Zipf
BY Robb & Robb,
Attorneys

Patented July 1, 1952

2,601,753

UNITED STATES PATENT OFFICE 2,601,753

CUTTER UNIT FOR MOWING MACHINES

Edward H. Zipf, Cleveland, Ohio

Application February 17, 1949, Serial No. 76,999

3 Claims. (Cl. 56—294)

My present invention relates to improvement in a special type of power lawn mowers which has come into use quite extensively more or less recently and which employs, generally speaking, cooperating rotary knives or blades and a stationary cutter blade, mounted upon the cutting units of the machine which customarily is power driven.

In the type of machine to which I refer the stationary cutter blade is of peculiar construction in that it is ordinarily made from a pressed steel structure which is sharpened at one edge to provide the cutting edge that cooperates with the cutting blades of the rotating cutting unit or member.

It has been found in the use of the type of mower to which reference is above made that when the mower is started in use with parts properly adjusted the cutting cooperation of the stationary blade with the rotating cutting blades will be effective initially, but after continued use for some time the center portion of the stationary cutter blade at its cutting edge moves slightly away from the central portions of the cutting edges of the cutting knives of the rotary member and the efficiency of the machine for the cutting operation of the grass at the middle portions of the stationary blade and rotating blades becomes greatly reduced. It has been found furthermore that it is difficult to readjust the cutting blade which is stationary in order to obviate the difficulties of the cutting action along the central portion of said blade, and a special object of my invention has been to do away with the difficulty which has been experienced in the above connection by providing means for maintaining close edge to edge contact between the cutting edge of the stationary blade and the rotary blades during the cutting operation.

One of the reasons why the cutting action of the cooperating blades above referred to becomes ineffectual at the portions mentioned arises from the fact that in the operation of the mower as it is moved over the lawn or grass to be cut, considerable vibration is set up in the stationary blade tending to move the latter at the central unanchored portion thereof away from the rotary knives of the rotary cutting member. Under such conditions of course the proper cutting action of the stationary blade in relation to the rotary knives is interfered with and frequently becomes wholly ineffective.

With the foregoing in view it has been a special object of my invention to provide means to act upon the central portion of the stationary cutting blade to prevent any shifting movement of this portion of the blade, once the blade is adjusted properly in relation to the cutting knives, away from said cutting knives as the latter rotate to bring their cutting edges into coaction with the cutting edge of the stationary blade.

Another object which I have in view in the development of the improvements of this invention has been to design an attachment means that may be applied to the mowers of the type I refer to at present in use, as well as to said mowers when originally put out by the factory, whereby to obviate the difficulties which arise in the proper cutting action of the cutting instrumentalities along the lines which I have above set forth.

A proper understanding of my invention will be had upon reference to the following detailed description, in conjunction with the accompanying drawings, and in said drawings.

Figure 1:
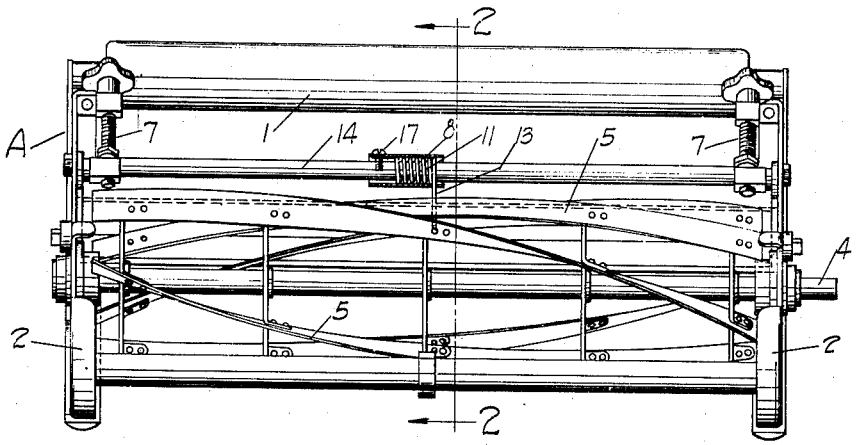
Figure 1 is a top plan view of the cutting unit of a power lawn mower of the type to which my invention is applied, bringing out the construction of the attachment means which are utilized in the form of a resilient or spring device, the latter being illustrated in cooperation with the stationary cutter blade of the cutting unit.

Since the general machine or mower which is illustrated in my drawings is of a conventional type and well known at the present time in the art it is unnecessary to refer to all of the details of its construction. I will therefore mention primarily those features of the machine which have to do with my invention.

In the drawings 1 designates the customary roller used in the machine and A generally designates the cutting unit of which the roller 1 forms a part. This cutting unit includes side frame members 2, runners or skid 3 supported thereon, a driving shaft 4 for operating the rotary cutting member which comprises the spiral cutting knives or blades 5 of a well known type used in nearly all lawn mowers. The rotating cutting member including the blades 5 is power operated by suitable driving means running from the tractor machine which is illustrated at B in dotted lines in Figure 2 and suitable means may be provided intermediate the tractor 3 and the connections from the tractor to the cutting unit for shifting the said unit into and out of action, into action by lowering the same to bring the cutting unit into position to cut the grass, and out of action by raising said unit in order to incapacitate the same when the tractor and the cutting unit are to be moved from one place to another without cutting operation.

Figure 2:
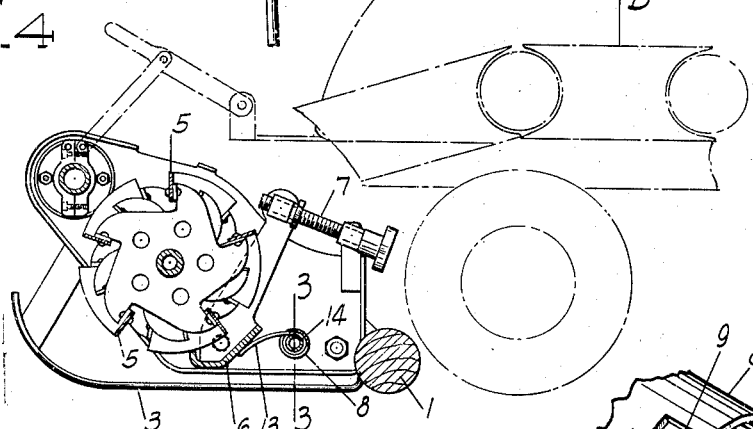
Figure 2 is a sectional view taken to the cutter unit shown in Figure 1, about on the line 2—2 of said figure looking in the direction of the arrows and in this Figure 2 there is shown in dotted lines the spot portion of the power or tractor machine that carries the cutting unit and by which the latter is propelled forwardly in the grass cutting operation.

Figure 2 best shows the stationary cutter bar or knife which is designated 6 and which consists of a pressed steel member or plate of unitary construction formed at its front edge with a sharpened cutting edge portion for coaction with the knives or blade 5 of the rotary cutting member previously mentioned.

The stationary cutting blade 6 is supported in the customary way at its ends from the side frame members 2 of the machine and suitable means such as the screws 7 may be employed for the adjustment of the cutting blade 6 in relation to the cutting knives 5, all as well known in the art.

In these machines embodying the general features above referred to the stationary blade 6 has heretofore been customarily supported only at its end and held in proper position by the screw 7 adjacent to the frame members 2.

For the purposes of my invention I have designed an attachment means that may be applied to a machine constructed in the manner set forth for applying a yielding pressure forwardly and upwardly on the stationary cutter blade 6 which pressure is applied at the middle portion of the said member 6 and is calculated to a nicety by proper adjustment of the means of my invention so as to be just properly sufficient to limit the vibration of the member 6, or movement of said member 6 away from a proper cutting position in relation to the knives 5 of the rotary cutting member. It has been a special object of my invention to so design my attachment means that it may be applied to the present construction of the machines with which the same is adapted to be utilized.

Figure 4:
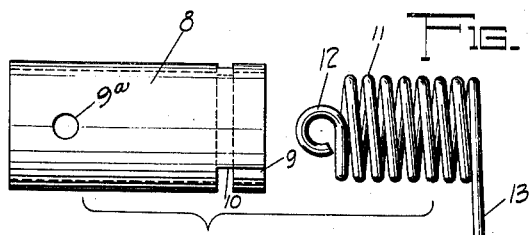
Figure 4 is a combined view showing the spring device or attachment means which I apply to the middle of the connecting cross bar between the frame sides of the cutting unit the spring member being separated from the attachment sleeve by which it is secured to and adjusted in relation to said cross bar.
Figure 5:
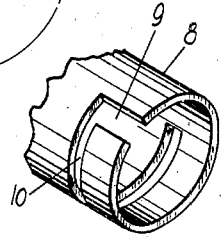
Figure 5 is another detail view bringing out more fully the form of my attachment unit sleeve member for stabilizing the stationary cutter blade of the machine.
Figure 3:
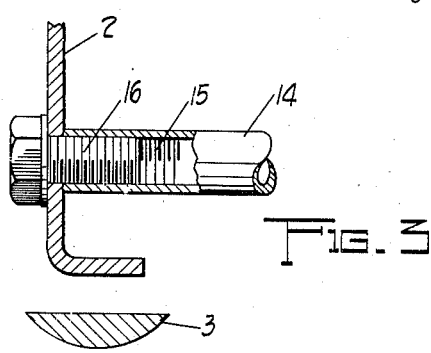
Figure 3 is a detailed view showing more clearly the manner in which each end of the frame cross bar that reinforces and connects the side frame members of the cutting unit, is connected with an adjacent one of the side frame members located just above an adjacent runner or skid member that slides over the surface of the earth during the grass cutting operation.

The parts of my attachment means are best seen in Figures 1 and 4 of the drawings, and also in Figure 5. The attachment means comprises essentially three parts namely a sleeve 8 having an aperture 9a therein through which a fastening screw may be passed, said sleeve being formed with a bayonet slot near one end the crossed portion of which designated 9 and the main portion extending circumferentially of the sleeve is designated at 10. The diameter of the sleeve is sufficiently large that there may be placed within the sleeve a resilient pressure member which is made in the form of a helical spring 11 at one end of which the metal of the spring is formed into a loop or eye 12, and the other end of the material of spring is extended to provide a resilient pressure arm 13. The spring 11 is of a diameter such that it will fit fairly snugly around the cross connecting bar 14 which connects opposite side frame members 2 of the cutting unit for the purpose of reinforcing and holding these members in proper relation. The connecting bar 14 is really made of tubular material as seen in Figure 3 and is internally threaded at the ends as at 15 to receive screw bolts 16 the heads of which are at the outer sides of the frame members 2 while the connecting bar 14 is disposed between said frame members. The parts 14 and 16 are those at present used in machines of the type to which my invention is applied.

In assembling the parts of my attachment the spring member 11 is inserted in the end of the sleeve 8 at which the bayonet slot 9—10 is located, the arm 13 passing into the main portion 10 of the slot through the crossed portion 9. Before placing the attachment in position the bar 14 is provided with an opening or aperture tapped therein so as to receive the screw 17 which secures the sleeve 8 and the spring 11 to the member 14. In so securing the parts the screw 17 passes through the aperture 9a in the sleeve 8 and through the eye or loop 12 of the spring member 11 and thereafter enters the screw opening in the bar 14. In this manner the spring 11 is anchored to the bar 14 as well as the sleeve 8 and it is contemplated that the anchored position of the members 8 and 11 will be such that the spring arm 13 will extend so as to bear against the rear portion of the stationary cutting blade 6 thereby to maintain this blade under pressure at the middle portion thereof in the direction of the cutting knife 5.

Once the parts 8 and 11—12 are affixed to the cross bar 14, the bar 14 will be turned clockwise as seen in Figure 2 until the necessary compression of the spring arm 13 against the blade 6 is obtained. This pressure adjustment must be made in an accurate manner to make certain that the cutting edges of the blade 6 and knives or blades 5 will perform cutting at highest efficiency. When the setting of the arm against the blade 6 is completed the screws 16, previously loosened to turn the bar 14, are tightened up and the bar 14 fixed in its position on the parts 2.

The arm 13 acting on the blade 6 limits the vibration of the blade during use of the machine, and if the blade at its middle portion should tend to shift away from cutting contact with the knives 5 for any other reason (torque on the frame parts of the cutting units, etc.) the spring arm will counteract the above tendency and ensure proper operation of the cutting unit at highest efficiency.

Having thus described my invention, what I claim as new and desire to secure by Letters Patent of the United States, is:

1. A cutting unit for mowing machines comprising, in combination, a frame including side frame members, a stationary cutting blade supported at its ends on said frame members, adjustable means at the ends of said blade for adjusting the same to different fixed positions, a rotatable cutting member on said frame comprising cutting knives cooperable with the cutting blade, a yieldable spring member directly engaging the cutter bar midway of its ends, means for holding the yielding member against the cutting blade comprising a cross bar on the frame, and instrumentalities to maintain the cross bar in adjusted positions on the frame for determining the amount of pressure of the yielding member against the middle of the cutting blade.

2. A cutting unit for mowing machines, comprising, in combination, a frame including side frame members, a rotatable cutting member on said frame comprising cutting knives, a stationary cutting blade adjustable to different fixed positions on said frame and having a cutting edge to coact with said knives, screw devices for fixing the position of the cutting blade relatively to the knives, a spring arm mounted on adjusting means supported intermediate the side frame members and separate from said screw devices, and yieldably pressing the cutting blade toward said knives, said means being provided to adjust the yielding bearing pressure of said arm against the cutting blade and including a cross bar on the frame and securing means for fixing the cross bar in rotatively adjustable position on the side frame members.

3. A cutting unit as claimed in claim 2, having a helical spring encircling the cross bar and fixed thereto, said spring arm forming an extension of one end of said helical spring, a sleeve surrounding the helical spring and interlocked with the spring arm aforesaid, and a fastening securing the sleeve fixedly to the cross bar.

EDWARD H. ZIPF.

REFERENCES CITED

The following references are of record in the file of this patent:

UNITED STATES PATENTS

| Number | Name | Date |
| --- | --- | --- |
| 1,461,532 | Lane | July 10, 1923 |
| 1,802,304 | Anderson | Apr. 21, 1931 |
| 2,080,354 | Diel | May 11, 1937 |
| 2,080,648 | Ainsworth | May 18, 1937 |